United States Patent Office 2,741,047
Patented Apr. 10, 1956

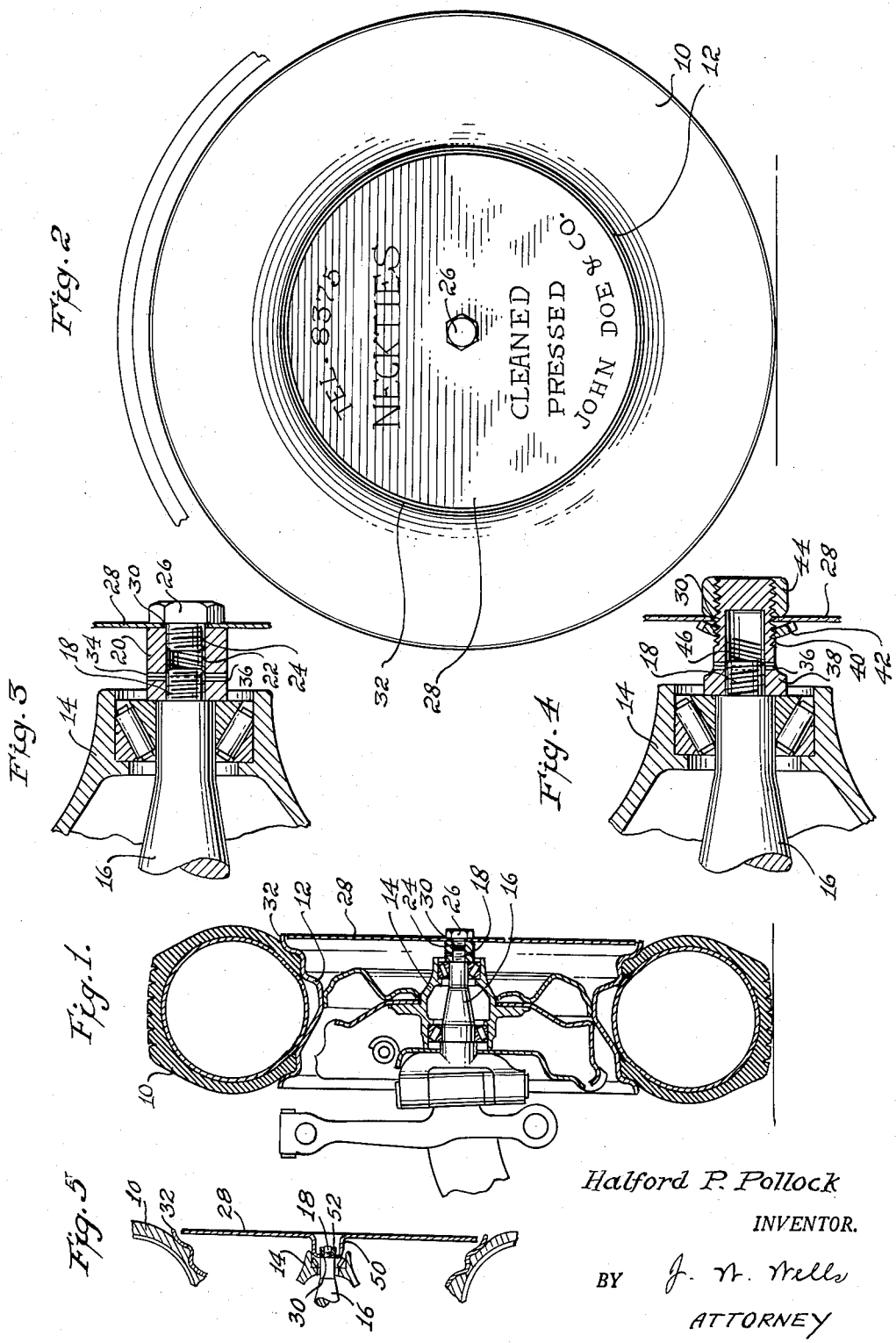

2,741,047

ADVERTISING DEVICE FOR MOTOR VEHICLES

Halford P. Pollock, Trenton, N. J.

Application April 21, 1953, Serial No. 350,149

1 Claim. (Cl. 40—129)

This invention relates to advertising devices and particularly to signs to be carried by and displayed on delivery trucks or other motor vehicles.

One of the principal objects of the present invention is to provide a plate bearing advertising matter and attachable to either of the front wheel spindles of a motor vehicle in such a manner that it will appear as a part of the wheel assembly, but will remain stationary while the wheel rotates.

Another object of this invention is to provide an extension adapter which can be substituted for the conventional nut on the outer end of the spindle, and which adapter, being of greater length than the conventional nut, spaces the sign plate a predetermined distance outwardly from the wheel.

A further object of the present invention is to provide an adapter for the purpose mentioned with axially adjustable clamping means for securing the sign plate to the spindles of a motor vehicle and spaced outside the wheel structure irrespective of the type of tire used.

A still further object of this invention is to provide an advertising device of the character mentioned in which the surface of the sign plate and the lettering thereon will be painted with a luminous paint in various combinations of colors to effect a spectacular contrast with the visible portion of the rotating wheel.

In carrying out my invention I have found that a very attractive combination is to make the sign plate in the form of a circular disk of a diameter which will fit closely inside the conventional rim of the tire. However, the disk may be made in any desired shape wtihout affecting the means for attaching it to a wheel spindle.

Other objects and advantages of my invention will appear from the following specification in which reference is had to the accompanying drawing forming a part hereof, in which, Fig. 1 is a sectional view through the hub of a front motor vehicle wheel and showing one form of my invention attached to the spindle of the wheel;

Fig. 2 is a side view of the wheel and sign assembly shown in Fig. 1;

Fig. 3 is an enlarged detail view of the disk or sign plate securing means shown in Fig. 1;

Fig. 4 is an enlarged detail view showing a modified form of adapter; and

Fig. 5 is a partial view similar to Fig. 1, but showing a modified form of advertising plate.

Referring to the drawings in which like numerals designate like parts in the several views, 10 designates the tire, 12 the rim and 14 the hub of a conventional front motor vehicle wheel which is rotatably mounted on a spindle or axle 16 which is provided with a reduced and threaded end portion 18. Ordinarily the wheel is secured on the spindle by means of a relatively short nut (not shown) which is screwed on the reduced portion 18, but in the attachment of my sign plate to the spindle 16 the original nut is removed and, in its place, an adapter 20, which is of substantially greater length than the conventional nut, is screwed on the reduced portion 18 of the spindle. The forward portion of the adapter functions in lieu of the nut to hold the wheel assembly on the spindle 16.

The form of adapter 20 shown in Figs. 1 and 3 is provided with a through axial bore 22 which may be threaded from end to end. A screw 24, having an enlarged head 26, is threadedly insertible in the rear end of the adapter to clamp the sign plate 28 rigidly, but detachably, to the adapter. The plate is provided with a central opening 30 through which the screw 24 is inserted. The head 26 may be of any desired shape to provide a hold for a wrench or other means of setting up the screw 24.

As shown in Figs. 1 and 2, a very symmetrical assembly is provided by making the sign plate 28 in the form of a circular disk of a diameter to fit within the edge of the larger flared portion 32 of the rim 12. Obviously, the adapter 20 must be of substantially greater length than the original spindle nut in order to space the plane of the disk axially and outwardly the correct distance to bring it within the flared portion 32. The adapter 20 may be provided with a plurality of circumferentially spaced openings 34 in either of which a cotter or other fastening pin 36 may be inserted through the reduced portion 18 to lock the adapter against rotation.

The modified form of adapter 38 illustrated in Fig. 4 is generally similar to the adapter 20 shown in Figs. 1 and 3, in that its front end functions in the same manner as the original spindle nut to hold the wheel against axial movement on the spindle, and is provided with cooperative screw means for clamping the sign plate, or disk 28 to the rear end of the adapter. However, this modified form of adapter is provided with exterior threads 40 on which is mounted a concave, axially adjustable lock washer 42. The disk 28 is mounted on the adapter and clamped thereon against the lock washer by means of a nut 44 threaded on the end of the adapter. If desired the bore 46 in the adapter may terminate short of the rear end, thereby presenting a solid end within the nut. As previously mentioned, different types of tires may require the disk 28 to be farther outward or inward to bring it barely within the edge of the flared portion 32 of the rim 12, and the adjustable lock washer 42 affords efficient means for axial adjustment of the disk on the adapter 38.

As shown in Fig. 5, the circular plate 28 may be formed with a cupped central portion 50 with the central opening 30 in its closed end which fits over the reduced threaded portion 18 of the spindle 16 against the shoulder formed by the reduced end portion. The cupped portion of the plate 28 is of sufficient length to space the plate 28 within the plane of the rim 32 and it can be tightly clamped against the shoulder of the spindle by means of a conventional nut 52. This construction obviates the necessity of an adapter.

Although certain specific embodiments of my invention have been illustrated and described, various changes in the details of construction may be made within the spirit and scope of my invention. Therefore, it should be understood that the embodiments of my improved advertising device shown and described are intended to be illustrative, only, and not limited to such specific construction.

I claim:

An advertising device of the character described comprising, in combination, a non-rotatable spindle terminating in a reduced, threaded outer end portion forming a vertical shoulder on said spindle, a wheel rotatably mounted on said spindle, said wheel having an annular rim the frontal edge of which projects outwardly beyond the end of said reduced portion of the spindle, a circular plate of a diameter to fit loosely within said annular rim, said plate having formed centrally therein an inwardly projecting cupped portion provided with a reduced central opening to fit over the reduced end portion of the spindle, a nut on the threaded portion of the spindle for clamping the cupped portion of said plate against the vertical shoulder on said spindle, said cupped portion being of such a length as to fix the outer surface of said plate in substantially the same plane as that of the frontal edge of said rim.

References Cited in the file of this patent

UNITED STATES PATENTS

| | | |
|---|---|---|
| 1,522,904 | Pack et al. | Jan. 13, 1925 |
| 1,589,806 | Kayuk | June 22, 1926 |
| 1,590,189 | Hamilton | June 29, 1926 |
| 1,739,577 | Cantu | Dec. 17, 1929 |
| 2,109,684 | Short | Mar. 1, 1938 |
| 2,548,070 | Ryan | Apr. 10, 1951 |

FOREIGN PATENTS

| | | |
|---|---|---|
| 259,626 | Italy | July 18, 1928 |